United States Patent [19]
Sylvester

[11] 3,946,681
[45] Mar. 30, 1976

[54] EARTH WORKING APPARATUS
[76] Inventor: Merton E. Sylvester, Rte. 1, Sabetha, Kans. 66534
[22] Filed: Dec. 26, 1974
[21] Appl. No.: 536,640

[52] U.S. Cl. .................. 111/7; 172/438; 172/491; 56/16.7
[51] Int. Cl.² ....................................... A01C 23/02
[58] Field of Search ....... 111/7.6, 85; 172/438, 491; 56/16.7

[56] References Cited
UNITED STATES PATENTS

| | | |
|---|---|---|
| 2,764,111 | 9/1956 | Collins .............................. 111/6 X |
| 2,782,739 | 2/1957 | Freer ................................ 111/7 |
| 2,853,030 | 9/1958 | Dugan .............................. 111/7 |
| 3,038,424 | 6/1962 | Johnson ............................ 111/7 |
| 3,745,944 | 7/1973 | Yetter et al ....................... 111/7 |
| 3,854,429 | 12/1974 | Blair ................................. 111/7 |

Primary Examiner—Stephen C. Pellegrino
Attorney, Agent, or Firm—Fishburn, Gold & Litman

[57] ABSTRACT

An earth working apparatus for use in agricultural pre-planting operations includes a first frame having laterally spaced ground engaging wheels and a second frame having a leading edge thereof pivotally mounted on the first frame adjacent a leading edge thereof and movable between a storage position and a working position. The second frame has a mower thereon for cutting vegetation extending above a ground surface and a first plurality of sweeps for opening a plurality of laterally spaced furrows to receive gaseous fertilizer therein and a second plurality of sweeps to close the furrows after introducing the gaseous fertilizer thereinto. The first plurality of sweeps each have a flow passage thereon for flow of gaseous fertilizer into the respective furrows from a storage and supply tank mounted on the first frame.

9 Claims, 10 Drawing Figures

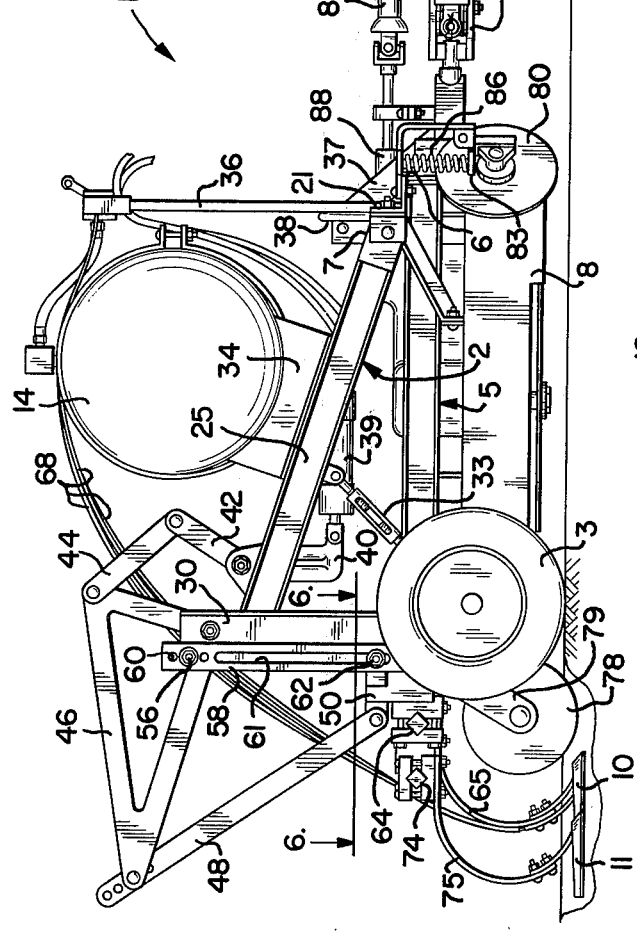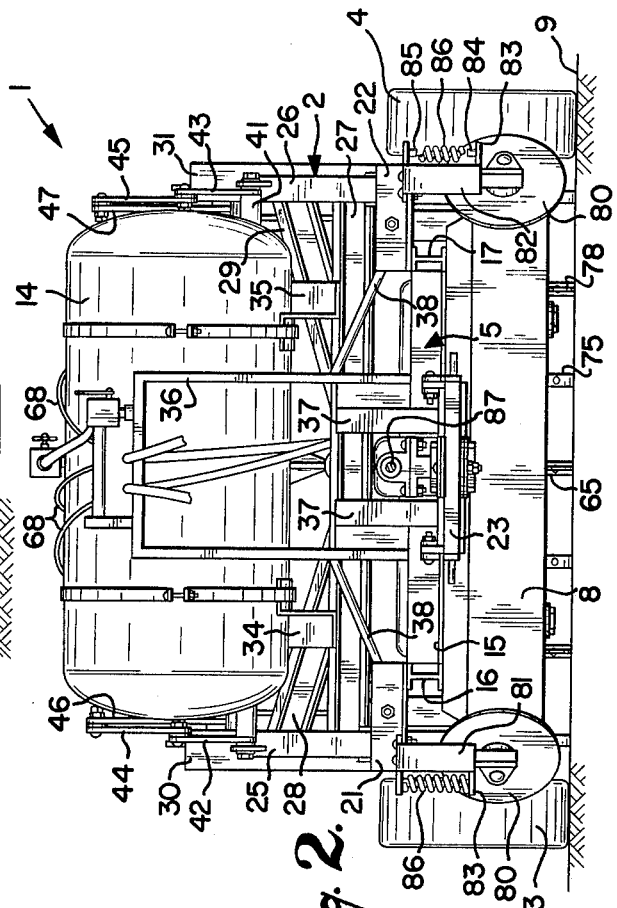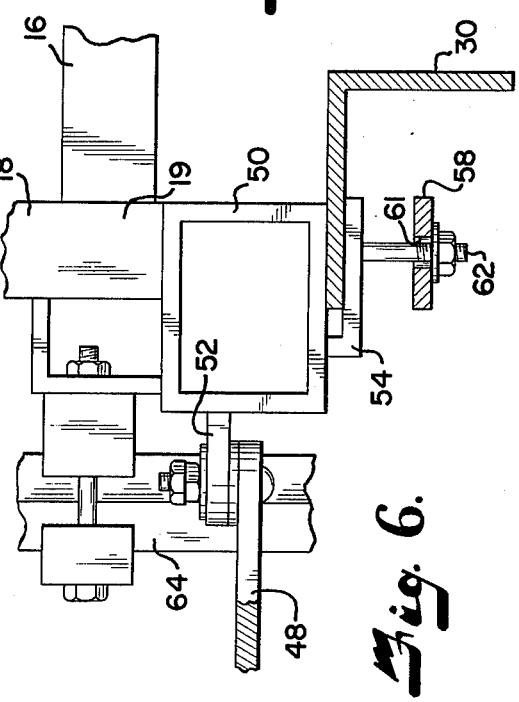

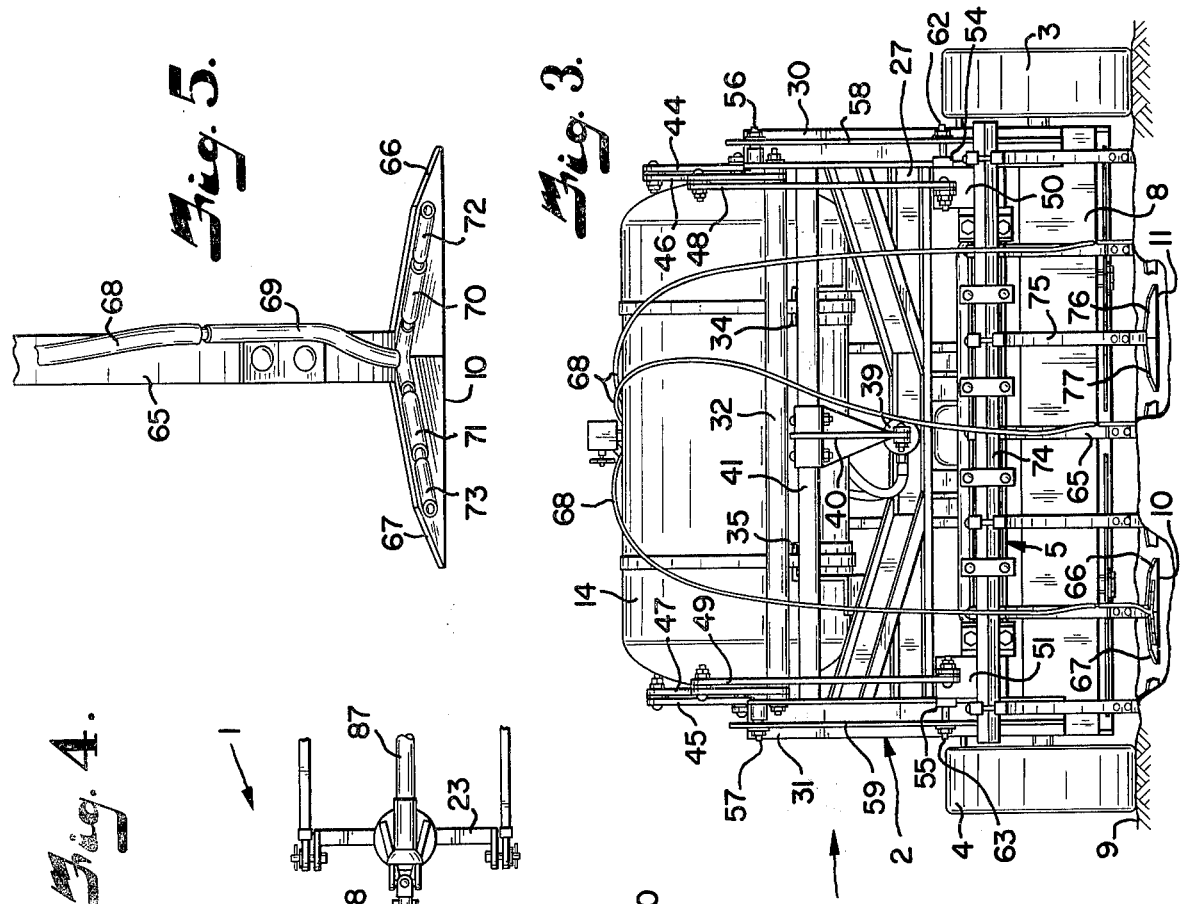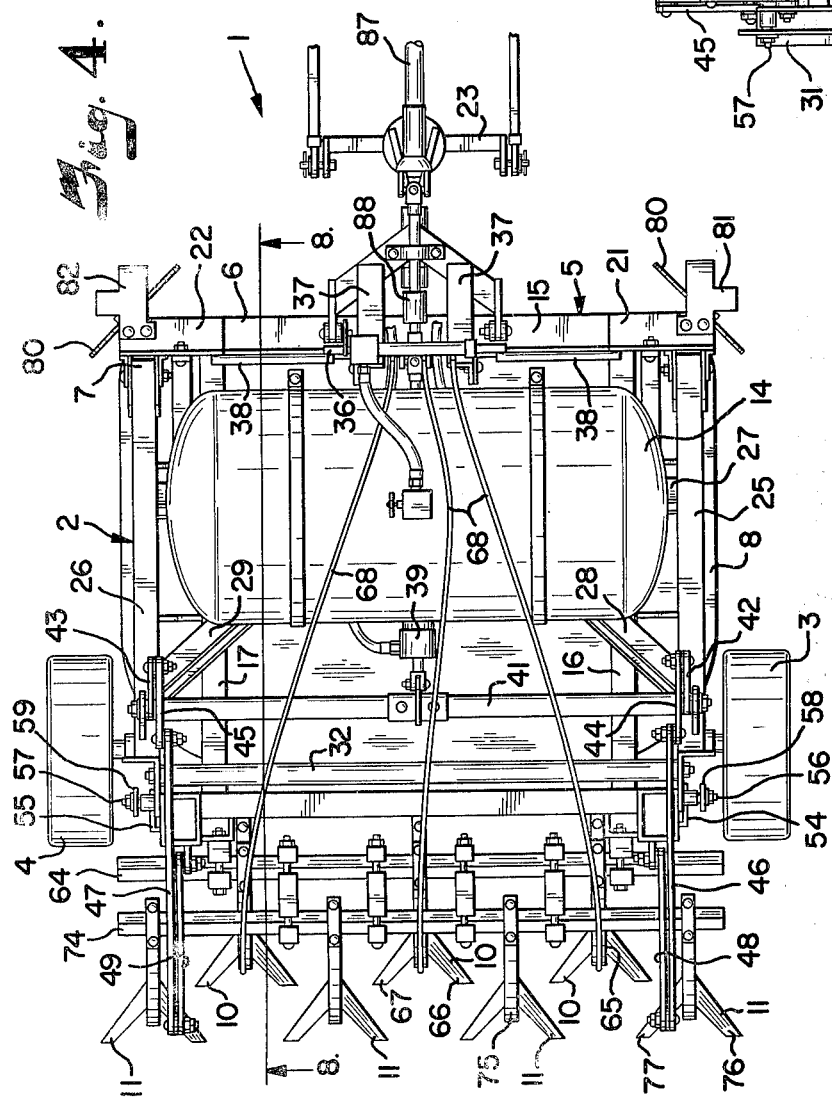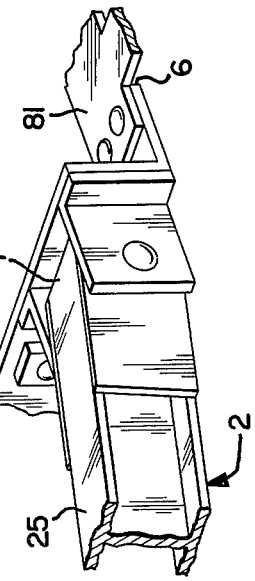

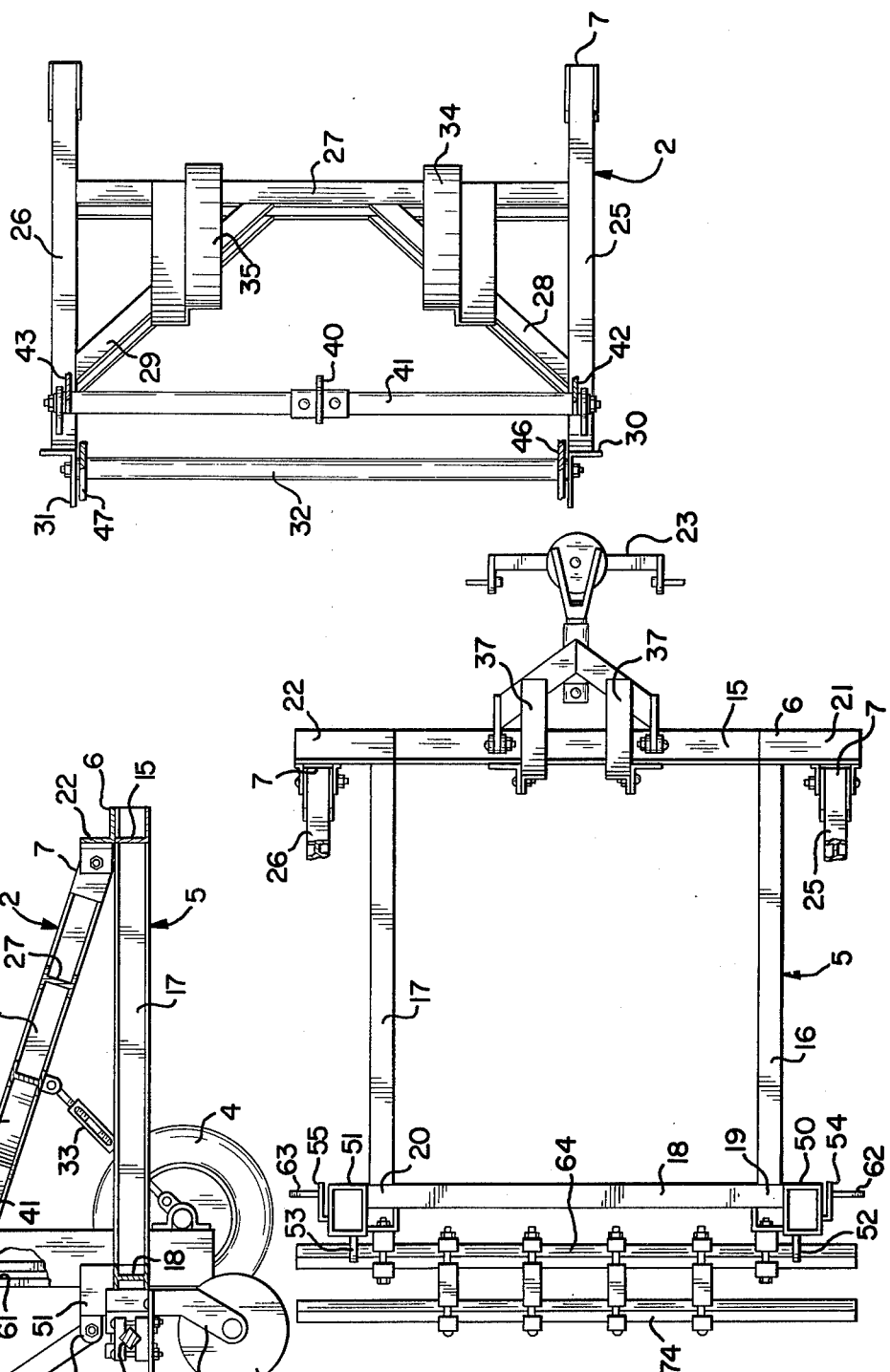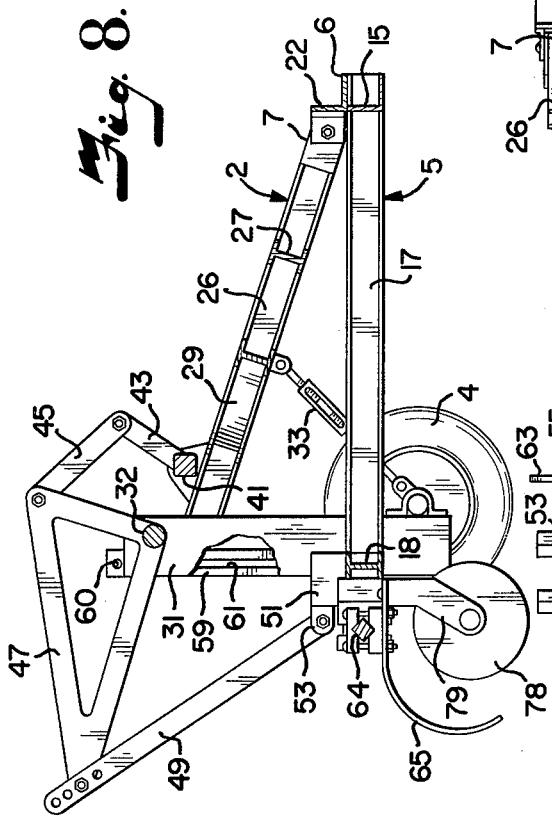

EARTH WORKING APPARATUS

The present invention relates to earth working apparatus for use in agricultural pre-planting operations and more particularly to an earth working apparatus adapted for mowing vegetation extending above a ground surface, opening furrows and for introducing gaseous fertilizer into such furrows and closing the furrows after introduction of the gaseous fertilizer thereinto.

The principal objects of the present invention are: to provide an earth working apparatus for use in agricultural preplanting operations and which is operative to increase soil humus and to introduce gaseous fertilizer into the soil; to provide such an apparatus having a first frame pivotally supporting a second frame for movement between a storage position and a working position with a mower and gaseous fertilizer applicators in operative position; to provide such an apparatus wherein the fertilizer applications include sweeps; to provide such an apparatus having earth moving members thereon which are operative to level soil and move same outwardly of the path of the mower and sweeps; to provide such an apparatus having means for moving the second frame between the storage position and the working position; to provide such an earth working apparatus having a hitch portion adapted to permit substantially free relative movement between a prime mover and the earth working apparatus; to provide such an apparatus having sweeps adapted for introducing gaseous fertilizer into furrows opened thereby and having trailing members operative to close the furrows after introduction of the gaseous fertilizer thereinto; to provide such an apparatus having cooperating means on the first and second frames to define a lower limit for downwardly movement of a trailing edge of the second frame thereby defining maximum penetration of sweeps into a ground surface; and to provide such an earth working apparatus which is economical to manufacture, durable in construction, positive in operation, and particularly well adapted for the proposed use.

Other objects and advantages of this invention will become apparent from the following description taken in connection with the accompanying drawings wherein are set forth, by way of illustration and example, certain embodiments of this invention.

The drawings constitute a part of the specification and include an exemplary embodiment of the present invention and illustrate various objects and features of the earth working apparatus.

FIG. 1 is a side elevational view of an earth working apparatus for use in agricultural pre-planting operations and embodying features of the present invention.

FIG. 2 is a front elevational view of the earth working apparatus.

FIG. 3 is a rear elevational view of the earth working apparatus.

FIG. 4 is a top plan view of the earth working apparatus.

FIG. 5 is an enlarged rear elevational view of one of a plurality of sweeps operative to apply gaseous fertilizer into furrows opened thereby.

FIG. 6 is an enlarged fragmentary sectional view taken on line 6—6, FIG. 1 and showing cooperating portions on first and second frames.

FIG. 7 is an enlarged fragmentary perspective view showing the pivotal mounting of the lower frame on the upper frame.

FIG. 8 is a longitudinal sectional view taken on line 8—8, FIG. 4.

FIG. 9 is a fragmentary top plan view of the upper frame of the earth working apparatus.

FIG. 10 is a fragmentary top plan view of the lower frame of the earth working apparatus.

Referring more in details to the drawings:

As required, detailed embodiments of the present invention are disclosed herein, however, it is to be understood that the enclosed embodiments are merely exemplary of the invention which may be embodied in various forms. Therefore, specific structural and functional details disclosed herein are not to be interpreted as limiting but merely as a basis for the claims and as a representative basis for teaching one skilled in the art to variously employ the present invention in virtually any appropriately detailed structure.

In the disclosed embodiment of the present invention, the reference numeral 1 generally designates an earth working apparatus for use in agricultural pre-planting operations. The earth working apparatus 1 includes a first or upper frame 2 having laterally spaced ground engaging wheels 3 and 4 and a second frame 5 having a leading edge portion 6 thereof pivotally mounted on a leading edge portion 7 of the first frame 2. The second or lower frame 5 is movable between a storage position and a working position. The second frame 5 has a mower 8 thereon for cutting vegetation extending above a ground surface 9. The second frame 5 has a plurality of furrow openers 10 each operative to open a respective pair of laterally spaced furrows to receive gaseous fertilizer therein and a plurality of furrow closers 11 operative to close the furrows after introducing the gaseous fertilizer thereinto. The plurality of furrow openers 10 each have a flow passage thereon, as later described, for flow of gaseous fertilizer into the respective furrows from a storage and supply tank 14 mounted on the first frame 2.

The lower frame 5 may be any suitable structure adapted to support the mower 8 and be pivotally mounted on the upper frame 2. In the illustrated structure, the lower frame 5 includes a leading frame member 15 and laterally spaced side members 16 and 17 suitably secured to and extending rearwardly from respective opposite ends of the leading frame member 15. The lower frame 5 includes a trailing member 18 suitably secured to and extending between respective trailing ends of the end members 16 and 17 respectively. The trailing member 18 has opposite end portions 19 and 20 extending laterally beyond the end members 16 and 17 respectively, for a purpose later described.

The lower frame 5 includes opposite end portions 21 and 22 secured to and extending outwardly from leading ends of the end members 16 and 17 respectively. The end portions 21 and 22 are above and substantially parallel with the leading frame member 15 to substantially define extensions thereof.

A hitch device 23 is suitably secured to the leading member 15 of the lower frame 5 and extends forwardly therefrom for connection to a prime mover 24. The hitch device 23 is preferably adapted to permit substantially universal relative movement between the earth working apparatus 1 and the prime mover 24.

The upper frame 2 may be any suitable structure adapted to support the fertilizer tank 14 and have the ground engaging wheels 3 and 4 supported thereon. The upper frame 2 is illustrated as having laterally spaced end members 25 and 26 having the leading ends thereof pivotally connected to the end portions 21 and 22 respectively of the lower frame 5, as best seen in FIGS. 4, 7, and 10. The upper frame 2 includes a leading member 27 extending between and having opposite ends thereof suitably secured to the end members 25 and 26 respectively. The upper frame 2 includes suitable brace members 28 and 29 extending between and secured to the leading frame member 27 and the end members 25 and 26 respectively.

End standards 30 and 31 are secured to the trailing ends of the end members 25 and 26 respectively. Lower ends of the end standards 30 and 31 have suitable axles supported thereon for rotatably mounting the ground engaging wheels 3 and 4 respectively. A spreader member 32 extends between upper ends of the standards 30 and 31 and maintains a selected spacing therebetween, for a purpose later described.

The earth working apparatus 1 includes suitable knee braces 33 each extending between a respective one of the end members 25 and 26 and the axles for the ground engaging wheels 3 and 4 respectively to provide a substantially rigid upper frame 2. The fertilizer tank 14 is suitably supported on suitable saddles 34 and 35 which each have an outstanding flange adapted to have the tank supported thereon. In the illustrated embodiment, suitable adjustable straps each extend around a respective one of the flange of the saddles 34 and 35 and the tank 14. The fertilizer tank 14 has suitable controls and valves operative to control the supply of gas to the first sweeps 10. Flow of gaseous fertilizer from the tank 14 to the first sweeps 10 is preferably controlled from the prime mover 24, therefore, suitable flexible hoses communicating with controls on the tank 14 are supported on an upstanding frame 36 which is secured to and extends upwardly from the leading member 15 of the lower frame 5.

Suitable braces 37 extend between the upstanding frame 36 and the hitch device 23 and suitable lateral braces 38 extend between the upstanding frame 36 and the end portions 21 and 22 of the leading member 15 thereby substantially rigidly supporting the upstanding frame 36 and the flexible hoses supported thereon.

Means are mounted on the upper frame 2 and operatively connected to the lower frame 5 and to a power source of the prime mover 24 for selectively moving the lower frame 5 between the storage position and the working position. In the illustrated structure, a source of fluid under pressure is communicated to an extensible member 39 supported on the upper frame 2 and pivotally connected to one end of an L-shaped arm 40. The other end of the L-shaped arm 40 is connected to an intermediate portion of an elongated shaft 41 having opposite ends thereof rotatably supported in suitable bearings mounted on the end members 25 and 26 respectively of the upper frame 2.

Arms 42 and 43 are suitably secured to the elongated shaft 41 adjacent respective opposite ends thereof. The arms 42 and 43 extend substantially perpendicular to the shaft 41. First links 44 and 45 have one end thereof pivotally connected to the arms 42 and 43 respectively adjacent the outer ends thereof.

Bell cranks 46 and 47 are positioned adjacent and have a first pivot point thereof pivotally connected to the standards 30 and 31 respectively and adjacent the respective upper ends thereof. In the illustrated structure, the bell cranks 46 and 47 are suitably secured, as by welding, to respective opposite ends of the spreader member 32 and are movable therewith. Second pivot points of the bell cranks 46 and 47 have the other ends of the first links 44 and 45 respectively pivotally connected thereto. The bell cranks 46 and 47 have third pivot points having one end of second links 48 and 49 respectively connected thereto. The other ends of the second links 48 and 49 are pivotally connected to respective portions of the lower frame 5 whereby rotation of the elongated shaft 41 by the extensible member 39 is operative to selectively raise and lower the trailing end of the lower frame 5 and the mower 8 thereon.

In the illustrated structure, the trailing member 18 of the lower frame 5 has enlarged end portions 50 and 51 respectively with arms 52 and 53 extending outwardly and rearwardly therefrom to have other ends of the second links 48 and 49 respectively pivotally connected thereto.

Slide members or ears 54 and 55 are mounted on the enlarged portions 50 and 51 respectively and are positioned to define spaces receiving therein trailing portions of the standards 30 and 31 respectively. The enlarged end portions 50 and 51 and the ears 54 and 55 are in sliding engagement with trailing portions of the standards 30 and 31 to thereby guide the trailing end of the lower frame during raising and lowering thereof, as best seen in FIG. 6.

Cooperative members are mounted on the upper frame 2 and the lower frame 5 for defining a lower limit for downwardly movement of the trailing edge or end of the lower frame 5 when the lower frame 5 is in the working position. In the illustrated structure, fastening members 56 and 57 extend outwardly from upper ends of the end standards 30 and 31 respectively. Hanger members 58 and 59 are positioned adjacent and spaced outwardly from the end standards 30 and 31 respectively by suitable spacers. The hanger members 58 and 59 each have a plurality of longitudinally or vertically spaced apertures 60 therein and an elongated slot 61 extending longitudinally thereof. The elongated slot 61 of each hanger 58 and 59 has the lower end thereof adapted to be engaged by respective fastening members 62 and 63 extending outwardly from the slide members or ears 54 and 55 respectively so that when the fastening members 62 and 63 are in engagement with lower ends of the elongated slots 61 further downward movement of the trailing end of the lower frame 5 is substantially prevented.

The first plurality of sweeps 10 are mounted on a suitable tool bar 64 which is suitably supported on the trailing member 18 of the lower frame 5 as best seen in FIGS. 1, 4, 6, 8, and 10. A plurality of laterally spaced support members or standards 65 each have a rearwardly extending portion and an arcurate portion with a free end thereof spaced rearwardly of and below the tool bar 64.

The first plurality of sweeps 10 each have a pair of blades 66 and 67 mounted on the free end of the standards 65. The blades 66 and 67 each have a free end spaced outwardly from the respective standard 65. The blades 66 and 67 of the first plurality of sweeps 10 have flow passages each having a discharge opening adjacent the free end of the respective blades 66 and 67. The flow passages communicate with the fertilizer tank 14 for supplying gaseous fertilizer into furrows opened by the blades 66 and 67.

In the illustrated structure, a flexible hose 68 is supported on each of the standards 65 and communicates with the fertilizer tank 14. Each flexible hose 68 communicates with a rigid fitting 69 which is adapted to divide the flow to each of the blades 66 and 67 and to connect to flexible hoses 70 and 71 mounted on the blades 66 and 67 respectively. Rigid flow members 72 and 73 are mounted on the blades 66 and 67 respectively and have the free ends thereof adjacent the free ends of the blades 66 and 67 respectively.

The second plurality of sweeps 11 for closing the furrows are mounted on a second tool bar 74 which is supported on the second or lower frame 5 and spaced from the first tool bar 64. In the illustrated structure, the second tool bar 74 is mounted on the first tool bar 64, as best seen in FIGS. 1, 4, and 10. The second plurality of sweeps 11 are each supported on a respective one of a plurality of standards 75 which are substantially similar in structure to the standards 65. The standards 75 are mounted on the second tool bar 74 and alternate in lateral spacing with the standards 65 mounted on the first tool bar 64.

Each of the sweeps of the second plurality of sweeps 11 has a pair of outwardly extending blades 76 and 77 mounted on opposite sides of the respective standards 75 and spaced outwardly therefrom. The free ends of the blades 76 and 77 mounted on the standards 75 of the second tool bar 74 are each positioned in trailing relation with a respective one of the free ends of the blades 66 and 67 on the standards 65 on the first tool bar 64 whereby the blades 76 and 77 on the standards 75 on the second tool bar 74 close the furrows opened by the blades 66 and 67 on the standards 65 mounted on the first tool bar 64.

The earth working structure 1 includes a plurality of disks 78 each positioned in leading relation with a respective one of the sweeps of the first plurality of sweeps 10 to thereby cut vine type weeds to prevent binding of same on the standards 65. In the illustrated structure, an arm 79 is mounted on each of the standards 65 and has a respective one of the disks 78 rotatably mounted thereon.

A pair of front disks 80 are mounted on the lower frame 5 adjacent the leading edge 6 thereof and are adapted to move earth outwardly from the path of the mower 8, such as earth from a prior pass of the earth working apparatus 1. Arms 81 and 82 are mounted on the end portions 21 and 22 respectively and each has a mounting portion 83 pivotally mounted on the lower end of the respective arms 81 and 82. The respective disk 80 is rotatably mounted on the mounting portion 83 and an arm extends from the mounting portion 83 and has a rod 84 upstanding therefrom. The arms 81 and 82 each have a rod 85 depending from an upper portion thereof and positioned above and aligned with the rod 84 on the mounting portion 83. A resilient member 86, such as a coil spring, has opposite ends thereof sleeved on the rods 84 and 85 respectively. The resilient member 86 urges the respective disks 80 to the working position. Upon engagement of the respective disk 80 with an earth ridge or the like, the spring 86 will deflect to absorb the shock and the respective disk 80 levels the ground or moves stones or the like out of the path of the mower 8.

The mower 8 is driven by a suitable power takeoff 87 operatively connected to the prime mover 24. The power takeoff 87 preferably includes an overriding clutch 88 operative to permit rotation of blades of the mower 8 after the power is disconnected from the power takeoff 87.

In using an earth working apparatus constructed as illustrated and described, the hitch device 23 is suitably connected to the prime mover 24. The power takeoff 87 is operatively connected to the power source of the prime mover 24. Controls for the fertilizer tank 14 are also operatively connected to the prime mover 24. Suitable flexible hoses which are connected to the extensible member 39 are connected to the hydraulic system of the prime mover 24 whereby the lower frame 5 and the mower 8 thereon may be moved to a storage position for travel or a lowered position for working. When the sweeps 10 and 11 are in the ground, the engagement of the fastening members 62 and 63 with the lower end of the elongated slots 61 in the hangers 58 and 59 limits penetration of the sweeps into the ground surface to a selected depth below the ground engaging surface of the wheels 3 and 4.

The earth working apparatus 1 is operative to prepare soil in fewer trips or passes prior to preparation of a seed bed. The earth working apparatus effects a soil condition more adapted to absorb water. The apparatus also effects a covering over the soil of vegetation to serve as a mulch to substantially reduce erosion. Polution control is thereby aided by use of the illustrated and described earth working apparatus.

It is to be understood that while I have illustrated and described one form of my invention, it is not to be limited to the specific form or arrangement of parts herein described and shown.

What I claim and desire to secure by Letters Patent is:

1. An earth working apparatus comprising:
    a. a first frame having laterally spaced ground engaging wheels;
    b. a second frame mounted on said first frame and selectively movable between a storage position and a working position;
    c. means mounted on and extending from one of said first frame and said second frame for connecting same to a prime mover;
    d. means mounted on said second frame and movable therewith for cutting vegetation extending above a ground surface;
    e. means mounted on said first frame for storage of a supply of gaseous fertilizer;
    f. means operatively connected to said gaseous fertilizer storage means and mounted on said second frame and movable therewith for opening a plurality of laterally spaced furrows and introducing gaseous fertilizer into the furrows, said means for opening the furrows including means for closing same after introducing the gaseous fertilizer thereinto; and
    g. means mounted on said first frame and operatively connected to said second frame and to a power source of the prime mover for selectively moving said frame between the storage position and the working position, said means for selectively moving said second frame between the storage position and the working position including:
        1. upstanding guide portions on said first frame;
        2. means on said second frame in sliding engagement with and movable along said guide portions on said first frame;
        3. an elongated shaft rotatably mounted on said first frame and extending substantially transversely of the direction of travel of the prime mover;

4. an arm mounted on said shaft and extending outwardly therefrom;
5. a link having one end thereof pivotally connected to said arm;
6. a bell crank having a first pivot point connected to said first frame and a second pivot point having an other end of said link pivotally connected thereto, said bell crank having a third pivot point; and
7. a second link having one end thereof pivotally connected to the third pivot point of said bell crank and an other end thereof pivotally connected to said second frame whereby rotation of said shaft and arm in one direction is operative to raise said second frame and rotation of said shaft and arm in an opposite direction is operative to lower said second frame.

2. An earth working apparatus comprising:
a. a first frame having laterally spaced ground engaging wheels and a leading edge and a trailing edge, said first frame being elongated transversely of the direction of travel thereof;
b. a second frame mounted on said first frame and selectively movable between a storage position and a working position, said second frame having a leading edge and a trailing edge and being elongated transversely of the direction of travel thereof, the leading edge of said second frame being pivotally mounted on the leading edge of said first frame;
c. means mounted on and extending from one of said first frame and said second frame for connecting same to a prime mover;
d. means mounted on said second frame and movable therewith for cutting vegetation extending above a ground surface;
e. means mounted on said first frame for storage of a supply of gaseous fertilizer;
f. means operatively connected to said gaseous fertilizer storage means and mounted on said second frame and movable therewith for opening a plurality of laterally spaced furrows and introducing gaseous fertilizer into the furrows, said means for opening the furrows including means for closing same after introducing the gaseous fertilizer thereinto; and
g. means mounted on said first frame and operatively connected to said second frame and to a power source of the prime mover for selectively moving said second frame between the storage position and the working position, said means for selectively moving said second frame between the storage position and the working position including portions connected to the trailing edge of said second frame whereby the trailing edge of said second frame is moved toward and away from the trailing edge of said first frame.

3. An earth working apparatus as set forth in claim 2 including means mounted on said second frame and positioned between said second frame and the prime mover for moving earth outwardly from the path of said means for cutting vegetation.

4. An earth working apparatus as set forth in claim 2 wherein said means for selectively moving said second frame between the storage position and the working position includes:
a. upstanding guide portions on said first frame adjacent the trailing edge thereof;
b. means on said second frame in sliding engagement with and movable along said guide portions on said first frame;
c. an elongated shaft rotatably mounted on said first frame, said shaft being adjacent the trailing edge of said first frame and extending substantially transversely of the direction of travel of the prime mover;
d. an arm mounted on said shaft and extending outwardly therefrom;
e. a first link having a free end thereof pivotally connected to said arm;
f. a bell crank having a first pivot point connected to said frame adjacent the trailing edge thereof and a second pivot point having an other end of said link pivotally connected thereto, said bell crank having a third pivot point spaced rearwardly of the trailing edge of said first frame; and
g. a second link having one end thereof pivotally connected to the third pivot point of said bell crank and an other end thereof pivotally connected to said second frame adjacent the trailing edge thereof whereby rotation of said shaft and arm in one direction is operative to raise the trailing edge of said second frame and rotation of said shaft and arm in an opposite direction is operative to lower the trailing edge of said second frame.

5. An earth working apparatus as set forth in claim 2 wherein said means for opening a plurality of laterally spaced furrows and introducing gaseous fertilizer into the furrows includes:
a. a tool bar mounted on said second frame;
b. a plurality of laterally spaced standards mounted on and depending from said tool bar;
c. a pair of outwardly extending blades mounted on opposite sides of each of said standards and each having a free end spaced outwardly from said respective standard; and
d. a flow passage for each of said blades and each of said flow passages having a discharge opening adjacent the free end of said respective blade, said flow passages each receiving gaseous fertilizer from said gaseous fertilizer storage means.

6. An earth working apparatus as set forth in claim 5 wherein said means for closing the laterally spaced furrows after introducing the gaseous fertilizer thereinto includes:
a. a second tool bar mounted on said second frame and spaced from said first named tool bar;
b. a plurality of laterally spaced standards mounted on and depending from said second tool bar, said standards mounted on said second tool bar alternating with said standards mounted on said first named tool bar; and
c. a pair of outwardly extending blades mounted on opposite sides of each of said standards mounted on said second tool bar and each having a free end spaced outwardly from said respective standard, the free ends of said blades on said standards on said second tool bar being in trailing relation with the free ends of said blades on said standards on said first named tool bar whereby said blades on said standards on said second tool bar close the furrows opened by said blades on said standards on said first named tool bar.

7. An earth working apparatus comprising:
a. a first frame having laterally spaced ground engaging wheels and a leading edge and a trailing edge and opposite ends;
b. a second frame having a leading edge thereof pivotally connected to said first frame adjacent the leading edge thereof, said second frame having a trailing edge and opposite ends and being selectively movable between a storage position and a working position;
c. a frame extension mounted on the leading edge of said second frame and including means for connecting same to a prime mover;
d. means operatively connected to a power source on the prime mover and mounted on and movable with said second frame for cutting vegetation extending above a ground surface;
e. a tank mounted on said first frame for storage of a supply of gaseous fertilizer;
f. a first plurality of laterally spaced blades supported on said second frame and positioned adjacent the trailing edge thereof and movable therewith and operative to open a plurality of laterally spaced furrows;
g. means on each of said blades and operatively connected to said tank for introducing gaseous fertilizer into the furrows opened thereby;
h. a second plurality of laterally spaced blades supported on said second frame and positioned in trailing relation with said first named blades and operative to close the furrows opened by said first named blades after introducing the gaseous fertilizer thereinto; and
i. linkage means mounted on said first frame and operatively connected to said second frame adjacent the trailing edge thereof and to a second power source of the prime mover for selectively moving said second frame between the storage position and the working position, said first frame having guide portions engaged by said second frame during movement of said second frame.

8. An earth working apparatus as set forth in claim 7 wherein said linkage means for moving said second frame between the storage position and the working position includes:
a. an elongated shaft being positioned substantially parallel with the trailing edge of said first frame and having opposite ends thereof each rotatably mounted on a respective one of the opposite ends of said first frame;
b. a pair of arms each mounted on a respective one of the opposite ends of said shaft and extending outwardly therefrom and rotatable with said shaft;
c. a pair of first links each having one end thereof pivotally connected to a respective one of said arms;
d. a pair of bell cranks each having a first pivot point connected adjacent a respective one of the opposite ends of said first frame and a second pivot point having an other end of a respective one of said first links pivotally connected thereto, said bell cranks each having a third pivot point;
e. a pair of second links each having one end thereof pivotally connected to the third pivot point of a respective one of said bell cranks and the other end thereof pivotally connected to said second frame adjacent a respective one of the opposite ends thereof whereby rotation of said shaft and arms in one direction is operative to raise the trailing edge of said second frame and rotation of said shaft and arms in an opposite direction is operative to lower the trailing edge of said second frame; and
f. cooperating means mounted on said first frame and said second frame for defining a lower limit for downwardly movement of the trailing edge of said second frame when said second frame is in the working position.

9. An earth working apparatus as set forth in claim 8 wherein said means for defining a lower limit for downwardly movement of the trailing edge of said second frame includes:
a. an upstanding elongated guide portion for each of the opposite ends of said first framek said guide portions each being adjacent the trailing edge of said first frame;
b. an outwardly extending fastening member mounted on each of said guide portions;
c. a hanger member for each of said guide portions and having a plurality of apertures therein and positioned adjacent an upper end thereof for receiving therein said fastening member extending from said respective guide portion, said hanger members each having an elongated slot therein and having a lower end;
d. a slide member mounted on said second frame adjacent each of the opposite ends thereof and adjacent the trailing edge of said second frame and each having portions thereof in sliding engagement with said respective guide portion; and
e. a rod extending from one of the portions of each of said slide members and extending through and retained in the elongated slot and engageable with the lower end of said respective elongated slot.

* * * * *